United States Patent [19]

Fröhlich et al.

[11] Patent Number: 4,611,963

[45] Date of Patent: Sep. 16, 1986

[54] EXPANSION DOWEL WITH AN EXPANSION WEDGE AND AN ANNULAR EXPANSION MEMBER

[75] Inventors: Peter Fröhlich, Neuried; Armin Herb, Peissenberg, both of Fed. Rep. of Germany

[73] Assignee: Hilti Aktiengesellschaft, Furstentum, Liechtenstein

[21] Appl. No.: 722,158

[22] Filed: Apr. 11, 1985

[30] Foreign Application Priority Data

Apr. 12, 1984 [DE] Fed. Rep. of Germany ....... 3413854

[51] Int. Cl.[4] .............................................. F16B 13/06
[52] U.S. Cl. ......................................... 411/54; 411/75
[58] Field of Search ........................ 411/54, 55, 56, 57, 411/58, 59, 60, 61, 62, 76, 77, 78, 79, 80, 75, 44, 45, 448

[56] References Cited

U.S. PATENT DOCUMENTS

| 3,799,027 | 3/1974 | Galloway | 411/78 |
| 4,560,311 | 12/1985 | Herb | 411/44 |

FOREIGN PATENT DOCUMENTS 2533223  2/1977  Fed. Rep. of Germany .

Primary Examiner—Gary L. Smith
Assistant Examiner—Adrian H. Whitcomb, Jr.
Attorney, Agent, or Firm—Toren, McGeady, Stanger, Goldberg & Kiel

[57] ABSTRACT

An expansion dowel arranged to be anchored in a borehole includes an axially extending dowel member having a leading end and a trailing end and being partly sleeve-shaped extending from the trailing end. A wedge-shaped recess is formed inwardly from the outside surface of the dowel with the depth of the recess decreasing toward the leading end of the dowel member. A complementary shaped wedge member is located in the recess and is displaceable therein toward the leading end of the dowel member. An annular groove formed in the dowel member from the leading end toward the trailing end. The depth of the annular groove increases for at least a part of the axial length from the leading end of the dowel member. An expansion member is seated in the annular groove and extends around the dowel member. The expansion member has a stop shoulder located in the path of the wedge member as it is displaced toward the leading end. The wedge contacting the stop member moves the expansion member toward the leading end of the dowel member causing the expansion member to spread radially outwardly. Further, an axial loading on the dowel member at its trailing end tending to pull it out of the borehole effects a post expansion action due to the interaction of the expansion member and the wedge member.

9 Claims, 6 Drawing Figures

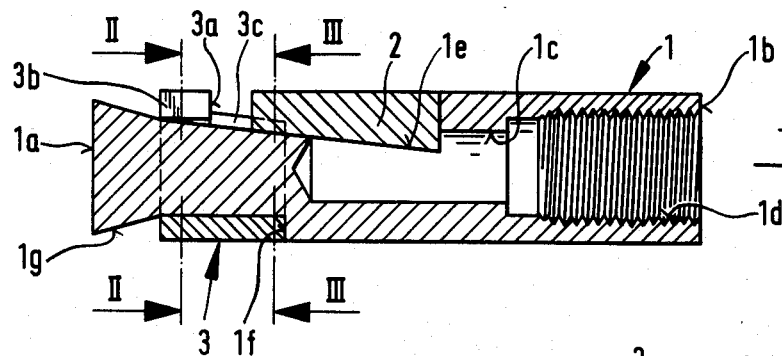
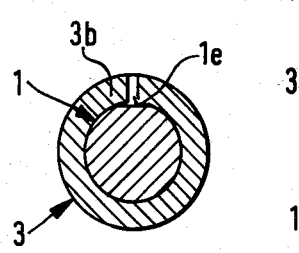
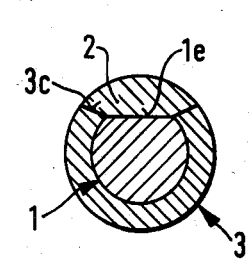
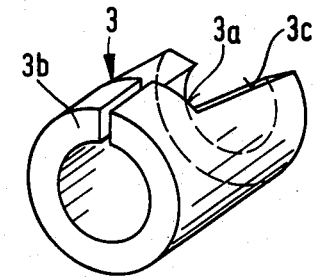
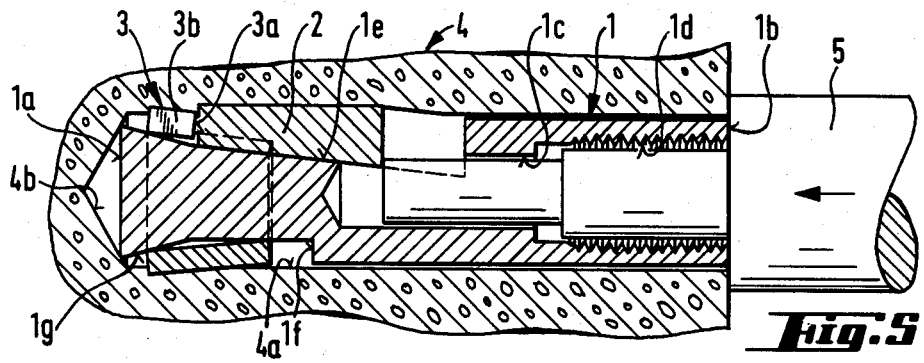
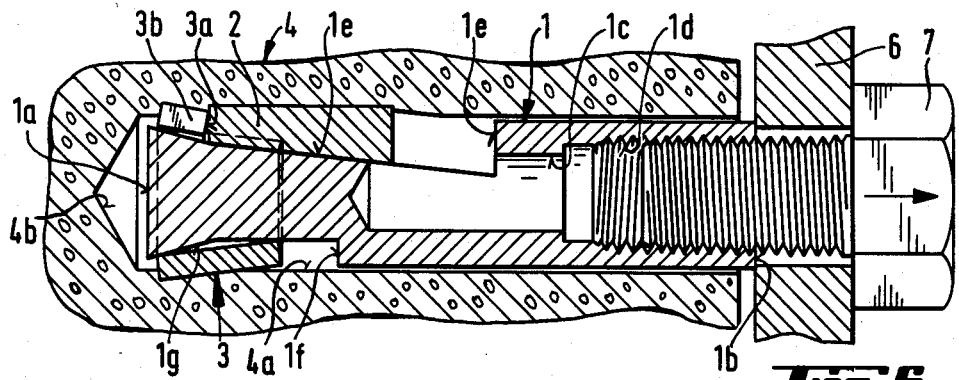

4,611,963

EXPANSION DOWEL WITH AN EXPANSION WEDGE AND AN ANNULAR EXPANSION MEMBER

BACKGROUND OF THE INVENTION

The present invention is directed to an expansion dowel including a dowel member with a leading end and a trailing end. The dowel member is sleeve-shaped at least for a part of its axial length from the trailing end. The trailing end is arranged to support a load. The outside circumferential surface of the dowel member is generally cylindrically shaped extending from the trailing end and the cylindrical shape is interrupted adjacent the leading end by an axially extending wedge-shaped recess having a depth decreasing toward the leading end. An expansion wedge is seated in the recess and projects inwardly into the bore formed by the sleeve-shaped part of the dowel member.

In expansion dowels there are two different types of expansion. Pre-expansion fixes the dowel and is effected by an expansion process when the dowel is placed into a receiving material and before a load is supported on the dowel. Post-expansion takes place when a load is placed on the dowel after it has been expanded and, accordingly, is dependent on the loading applied to the dowel.

Aside from expansion dowels which pre-expand or post-expand, there are expansion dowels which effect both pre-expansion and post-expansion. In the post-expansion group there is a known expansion dowel including a sleeve-shaped dowel member with a wedge-shaped recess having a depth decreasing toward the leading end of the dowel and arranged to receive an expansion wedge projecting partly into the interior of the sleeve-shaped dowel member. Pre-expansion of such a dowel is effected by a threaded pin which can be screwed into a thread within the sleeve-shaped dowel member and bears against the rear end of the expansion wedge. If an axial tension force is applied to the trailing end of the dowel member, it is displaced axially relative to the expansion wedge and post-expansion takes place.

While this known expansion dowel is simple to produce and use, it has a significant advantage as a result of the wedge-shaped expansion member in that expansion occurs only in a plane extending through the long axis of the dowel. During expansion the pressure required to achieve an adequate anchoring value can exceed the compressive strength of the receiving material for the dowel. Such excessive pressure can cause spalling of the receiving material particularly if the dowel is inserted into the receiving material at a small distance from an edge. When dowels are inserted into the tension region of a structure, cracks may develop which could impede post-expansion of the expansion dowel and could lead to the dowel falling out of the receiving material.

SUMMARY OF THE INVENTION

Therefore, the primary object of the present invention is to provide an expansion dowel which is both pre-expandable and post-expandable, and also ensures a uniform distribution of the expansion pressure around its circumference.

In accordance with the present invention, the outer circumferential surface of the dowel member adjacent its leading end has an annular groove with a depth decreasing toward the leading end of the dowel member. A generally annular shaped expansion member is seated in the annular groove and has a stop shoulder extending transversly of the axial direction of the dowel member and arranged to be contacted by the expansion wedge.

Accordingly, the expansion dowel has two different expansion elements located at its outer circumferential surface. The expansion wedge element is provided chiefly for the pre-expansion dowel and the generally annular expansion element serves chiefly for post-expansion and affords a uniform distribution of the expansion pressure around the circumference of the dowel member. Due to the arrangement of the stop shoulder relative to the expansion wedge, the annular expansion element can participate in the pre-expansion of the dowel. Such pre-expansion of the dowel ensures that post-expansion takes place when the dowel is loaded.

There are various possibilities for arranging the stop shoulder on the annular expansion element. In a preferred embodiment, the parts of the expansion element projecting into the wedge-recess form the stop shoulder for the wedge. With the annular expansion element projecting into the wedge-shaped recess, the expansion element is, at the same time, undetachably connected to the dowel member. The expansion element is deformable in the radial direction so that it does not impede the expansion action.

In a simple and preferred arrangement of the annular expansion member the stop shoulder is formed in the rear part of the expansion member. In the simplest arrangement, the expansion member is in the form of ring slotted in the axial direction.

For a compact arrangement of the expansion dowel it is preferable to locate the stop shoulder offset in the axial direction from the trailing end of the expansion member with regard to the insertion or placement direction of the dowel. With such an arrangement of the stop shoulder a shorter more compact expansion dowel is possible. Since the annular expansion member is preferably formed as a stamped bent part, no additional costs are involved and a saving in material results.

The expansion wedge and the expansion member can be arranged in a different manner relative to one another. In one advantageous arrangement the expansion member is supported at the expansion wedge when the expansion dowel is in the unexpanded state. With such an arrangement, the expansion wedge and the expansion member are displaced into an expanded position at the start of the pre-expansion operation. Accordingly, a small pre-expansion path is possible and, in addition, the generation of the expansion pressure around the entire circumference is available at the commencement of pre-expansion.

The demands on the behavior of the dowel during pre-expansion and post-expansion vary. As an example, during pre-expansion, a large radial expansion should take place with a relatively small axial expansion movement. During post-expansion, however, considerable expansion forces should be available. Accordingly, it is advisable for the stop shoulder on the annular expansion member to be spaced in the placement direction relative to the front end of the expansion wedge in the unexpanded state of the expansion dowel. This axial spacing between the stop shoulder and the front end of the expansion wedge enables the pre-expansion of the dowel to be primarily effected by the expansion wedge. In accordance with the existing conditions, such as borehole tolerances and the like, the expansion member can be displaced in the final part of the displacement path or it can remain in its initial position until post-expansion commences.

For the simple production of the dowel member it is preferable to form the base of the annular groove, at least in part, as a conical surface increasing in diameter toward the leading end of the dowel. Such a conical shape can be produced without any great expenditure for working tools. The conical shape can extend over the full axial extent of the annular groove or it can be located at the leading end of the dowel member. With this latter arrangement, a simple construction of the annular expansion member is possible so that it has a uniform thickness for its axial length.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending sectional view of an expansion dowel embodying the present invention and illustrated in the unexpanded condition;

FIG. 2 is a transverse cross-sectional view through the dowel taken along line II—II in FIG. 1;

FIG. 3 is a similar cross-sectional view through the dowel taken along the line III—III in FIG. 1;

FIG. 4 is a perspective view of the annular expansion member illustrated in FIG. 1;

FIG. 5 is a cross-sectional view similar to FIG. 1 with the dowel pre-expanded into a borehole; and FIG. 6 is a view similar to FIG. 5, however, illustrating the dowel after post-expansion.

DETAILED DESCRIPTION OF THE INVENTION

The expansion dowel as shown in FIGS. 1 to 6 is an axially elongated dowel member 1 having a leading end 1a and a trailing end 1b. As can be seen in FIGS. 5 and 6 the leading end 1a is inserted first into the borehole 4a in the receiving material 4. The dowel member 1 is sleeve-shaped for an axially extending part from the trailing end toward the leading end. Accordingly, the dowel member has a stepped blind borehole 1c extending inwardly from the trailing end 1b. From the trailing end, the borehole 1c has an internal thread 1d. The internal thread 1d is arranged to receive a member for applying a load at the trailing end of the dowel member 1. In place of the internal thread 1d, the dowel member could be provided with an external thread, a flange or a similar part for securing a load to the dowel member. From approximately the mid-point of the dowel member in the axial direction, a wedge-shaped recess 1e is provided with the depth of the recess decreasing in the direction toward the leading end 1a of the dowel member. An expansion wedge 2 is seated in the wedge-shaped recess 1e and in the unexpanded state the wedge is located against the end of the recess 1e closer to the trailing end 1b of the dowel member. As can be seen in FIG. 1, in this condition, the radially inner side of the expansion wedge projects into the borehole 1c in the dowel member 1. In the axially extending region of the dowel member 1 extending from the leading end 1a toward the trailing end 1b, an annular groove 1f is provided extending around the outer circumference of the dowel member. Between the trailing end 1b and the end of the annular groove 1f spaced from the leading end of the dowel member, the outer circumferential surface of the dowel member is generally cylindrically shaped. For an axial extending portion of the annular groove from the generally cylindrically shaped section, the groove is cylindrically shaped outside of the wedge-shaped recess 1e. Between the cylindrically shaped part of the annular groove 1f and the leading end 1a of the dowel member 1 the dowel member has an axially extending conically shaped surface with the diameter increasing toward the leading end. In the unexpanded condition shown in FIG. 1, an annular expansion member 3 is positioned in the annular groove 1f in the part which is cylindrically shaped. As can be seen in FIGS. 2 and 4 a slot is formed through the expansion member 3 so that it does not form a complete ring and whereby it can be radially expanded more easily. A stop shoulder 3a is formed on the expansion member 3 extending transversely of the axis of the dowel member and spaced between the leading and trailing ends of the expansion member. The stop shoulder 3a, in the unexpanded condition of the dowel member as shown in FIG. 1, is spaced axially from the leading end of the wedge 2. The stop shoulder 3a is formed in the parts 3b of the expansion member 3 which project into the wedge-shaped recess 1e. As indicated above, the stop shoulder 3a is spaced ahead of the wedge 2 in the direction of movement of the wedge during the expanding action. With this position of the shoulder 3a, the wedge 2 and the expansion member 3 are in overlapped relation so that a more compact construction of the expansion dowel is possible.

In FIG. 2 showing a cross-section through the dowel, the parts 3b of the expansion member 3 projecting into the wedge-shaped recess 1e can be seen. As illustrated in the cross-section in FIG. 3, the expansion wedge 2 is supported in part on the surface of the dowel member 1 within the recess 1e and on the axially extending edges 3c of the expansion member 3, that is, in the unexpanded condition of the dowel. The axial spacing of the stop shoulder 3a relative to the trailing end of the expansion member 3 is shown best in FIG. 4.

In FIGS. 5 and 6, the expansion dowel is inserted into the borehole 4a in the receiving material 4. The depth of the borehole 4a is dimensioned based on the axial length of the dowel member 1 so that, during the expansion operation as shown in FIG. 5, the base 4b of the borehole serves as an axial stop for the leading end 1a of the dowel member 1. The expansion wedge 2 is driven toward the leading end 1a of the dowel member 1 toward the base 4b of the borehole by a mandrel-shaped placement tool 5 inserted through the trailing end 1b into the borehole 1c. After the wedge 2 has moved axially forwardly over the axial distance between the leading end of the wedge 2 and the stop shoulder 3a in the unexpanded condition, it contacts the surface of the stop shoulder. If the wedge 2 is driven further toward the base 4b of the borehole, the expansion member 3 is also displaced relative to the dowel member due to the contact between the wedge 2 and the stop shoulder 3a. The expansion member 3 is spread radially outward effecting pre-expansion of the dowel. In this pre-expansion condition the leading end 1a of the dowel member 1 is in contact with the base 4b of the borehole 4.

In FIG. 6 a structural part 6 is connected to the dowel member 1 by means of a threaded bolt 7 screwed into the internal thread 1d. If the load applied to the dowel member acts counter to the insertion direction of the dowel member into the borehole, the dowel member is partially withdrawn out of the borehole along with the structural part 6 and the bolt 7 resulting in a further spreading of the expansion member 3 and the expansion wedge 2. Note in FIG. 6 that the leading end 1a of the dowel member 1 is spaced from the base 4b of the borehole 4. This displacement is characterized in the expansion dowel field as post-expansion. Such post-expansion is directly dependent on the size of the load applied at the trailing end of the dowel member 1. By a different construction of the two expansion elements, that is, the expansion wedge 2 and the expansion member 3, the angle of their abutting surfaces can be adapted to provide the optimum expansion action.

While specific embodiments of the invention have been shown and described in detail to illustrate the application of the inventive principles, it will be understood that the invention may be embodied otherwise without departing from such principles.

We claim:

1. An expansion dowel comprising an axially elongated dowel member having a leading end and a trailing end spaced apart in the axial direction with the leading end facing in the insertion direction in which said dowel member is inserted into a borehole or the like in a receiving material, the insertion direction corresponds to the axial direction extending from the trailing end to the leading end of said dowel member, said dowel member being sleeve-shaped for at least a part of the axial length thereof from the trailing end toward the leading end with the sleeve-shaped part forming an axially extending bore, the radially outside surface of said dowel member is generally cylindrically shaped from the trailing end thereof toward the leading end, a wedge-shaped recess is formed in the outside surface of said dowel member extending from the leading end to a point intermediate the leading end and the trailing end, said recess having a depth decreasing to the leading end of said dowel member, at the end of said recess adjacent the point intermediate the leading end and trailing end said recess opens into the bore formed by said sleeve-shaped part, an expansion wedge positioned within said recess and having a leading end and a trailing end spaced apart in the axial direction of said dowel member and said wedge being displaceable through said recess in the axial direction toward the leading end of said dowel member, said wedge having a radially inner surface and a radially outer surface with the radially inner surface in contact with the base of said recess radially inwardly from the cylindrically shaped outside surface of the dowel member and projecting into the bore formed in said dowel member wherein the improvement comprises that said dowel member has an annular groove encircling the axis thereof from the leading end toward the point intermediate the leading end and trailing end with at least an axially extending part of said annular groove from the leading end thereof increasing in depth, an expansion member encircling said dowel member in the axially extending region of said annular groove and having a stop shoulder extending transversely of the axial direction of said dowel member and positioned in the path of said expansion wedge and arranged to be contacted by the leading end of said expansion wedge as said wedge is displaced toward the leading end of said dowel member.

2. An expansion dowel, as set forth in claim 1, wherein said expansion member is a split ring and has axially extending parts projecting into said wedge-shaped recess, said parts located at the end of said expansion member closer to the leading end of said dowel member and said parts extending for only a part of the axial length of said expansion member with the ends of said parts more remote from said leading end of said dowel member forming said stop shoulder.

3. An expansion dowel, as set forth in claim 2, said stop shoulder is located at the end of said expansion member more remote from the leading end of said dowel member.

4. An expansion dowel, as set forth in claim 2, wherein said stop shoulder is spaced toward the leading end of said dowel member from the end of said expansion member more remote from the leading end of said dowel member.

5. An expansion dowel, as set forth in claim 1, 2, 3 or 4, wherein said expansion wedge is supported on said expansion member when said expansion dowel is in the unexoanded condition.

6. An expansion dowel, as set forth in claim 1, 2, 3 or 4, wherein when said expansion dowel is in the unexpanded condition said stop shoulder on said expansion member is spaced toward the leading end of said dowel member from the end of said expansion wedge located closer to the leading end of said dowel member.

7. An expansion dowel, as set forth in claim 1, 2, 3 or 4, wherein the base of said annular groove is conically shaped for at least a portion of the axial length thereof from the leading end of said dowel member and said conically shaped part increases in diameter toward the leading end of said dowel member.

8. An expansion dowel, as set forth in claim 1, wherein said expansion wedge has a length extending in the axial direction of said dowel member which is less than the length of said wedge-shaped recess extending in the axial direction of said dowel member.

9. An expansion dowel, as set forth in claim 7, wherein said annular groove has a cylindrically shaped base extending from the smaller diameter end of said conically shaped base toward the trailing end of said dowel member, and in the unexpanded condition of said extension dowel said expansion member is seated in the cylindrically shaped base of said annular recess and has an axial length corresponding to the axial length of the cylindrically shaped base of said annular recess.

* * * * *